United States Patent [19]

Welter et al.

[11] Patent Number: 5,074,477

[45] Date of Patent: Dec. 24, 1991

[54] METHOD OF DISPOSING OF COOLING UNITS

[75] Inventors: Hubert Welter; Hans-Peter Walter; Alfred Walter; Cornelius Welter, all of Mettlach; Herman-Josef Walter, Saarburg, all of Fed. Rep. of Germany

[73] Assignee: SEG Sonder-Entsorgungs-Gesellschaft mbH, Mettlach, Fed. Rep. of Germany

[21] Appl. No.: 626,477

[22] Filed: Dec. 12, 1990

[30] Foreign Application Priority Data

Dec. 18, 1989 [DE] Fed. Rep. of Germany ....... 3941742

[51] Int. Cl.$^5$ .......................................... B02C 11/08
[52] U.S. Cl. ...................................... 241/18; 241/24; 241/57; 241/DIG. 38
[58] Field of Search ...................... 241/23, 24, 18, 57, 241/DIG. 38; 62/149, DIG. 13

[56] References Cited

U.S. PATENT DOCUMENTS

| | | | |
|---|---|---|---|
| 4,067,502 | 1/1978 | Moreu et al. | 241/DIG. 38 X |
| 4,230,566 | 10/1980 | Faudree, III | 241/280 X |
| 4,245,999 | 1/1981 | Reinger | 241/DIG. 38 X |
| 4,304,873 | 12/1981 | Klein | 241/27 X |

Primary Examiner—Mark Rosenbaum
Assistant Examiner—Frances Chin
Attorney, Agent, or Firm—Peter K. Kontler

[57] ABSTRACT

Useless refrigerators or other commodities which contain or consist of polyurethane foam wherein the cells confine fluorochlorohydrocarbon gas are relieved of refrigerant and lubricant prior to being comminuted into 1 cm$^3$ cubes or similar particles. The particles are classified in a suction chamber to segregate comminuted foam from metallic and/or plastic materials, and the particles of foam are thereupon ground and/or otherwise pulverized to a size in the range of 0.1 mm. This destroys the cells and releases the gas which is filtered, condensed and mixed with water prior to confinement in vessels.

8 Claims, 5 Drawing Sheets

METHOD OF DISPOSING OF COOLING UNITS

BACKGROUND OF THE INVENTION

The invention relates to improvements in methods of and in apparatus for disposing of certain bulky commodities, such as refrigerators, freezers and other cooling units. More particularly, the invention relates to improvements in methods of and in apparatus for disposing of commodities which consist of or contain polyurethane foam wherein the cells confine fluorochlorohydrocarbon gas. Still more particularly, the invention relates to improvements in methods and apparatus which can be practiced and utilized with advantage to dispose of pretreated cooling units, particularly cooling units which are devoid of lubricant and refrigerant.

The number of discarded cooling units in industrialized countries is growing at a staggering rate from year to year. For example, the number of cooling units which are discarded per annum in the territory of former Western Germany is well above two million. These discarded cooling units take up approximately 650,000 cubic meters of space which amounts to a volume of approximately 325,000 cubic meters when the discarded cooling units are transferred to garbage dumping grounds. This is the presently prevailing mode of finally disposing of useless cooling units.

Mere dumping of damaged, destroyed, antiquated and other useless cooling units at garbage disposal grounds constitutes a procedure which is objectionable and outright unacceptable for a number of important reasons. First of all, such cooling units contain many substances which contribute to contamination of the atmosphere as well as of waters and of the soil. Secondly, mere dumping of useless cooling units at garbage collecting locations constitutes an unacceptable waste of valuable materials including plastics, metals and others. Recovery of such valuable materials is necessary for several reasons, such as savings in materials as well as a reduction of space requirements of those parts of cooling units which cannot be recycled for renewed use or to promote their disintegration without affecting the atmosphere, the waters and/or the ground.

A typical discarded cooling unit (such as a refrigerator or freezer) normally contains large quantities of recoverable metallic and plastic materials. In addition, such typical cooling unit contains substantial quantities of materials which are pollutants of the atmosphere, soil and/or water. For example, a standard cooling unit is likely to contain 140 grams of coolant or refrigerant (e.g., R12) which is caused to circulate in the cooling circuit of an operative cooling unit and contains fluorochlorohydrocarbon gas. In addition, a typical cooling unit will contain approximately 300 grams of compressor oil which is contaminated with fluorochlorohydrocarbon gas and is confined in the compressor of the cooling unit, as well as between 300 and 1000 grams of fluorochlorohydrocarbon gas (R 11) in the cells or pores of polyurethane foam which is used in cooling units as an insulating material. The gas in the cells of polyurethane foam in a cooling unit which is discarded at a dumping ground in the presently known or customary manner will escape for a period of years to be released into the atmosphere and/or to seep into the soil during progressive decomposition of polyurethane foam.

Certain communities, cities and other political entities have established stringent rules and regulations to remedy the just outlined unsatisfactory situation resulting from dumping of useless cooling units by requiring at least partial treatment of cooling units prior to dumping at the waste collecting facilities. For example, it is already known to remove or expel coolants and lubricants (such as compressor oil) from useless cooling units. Reference may be had to commonly owned copending patent application Ser. No. 07/487,029 filed Feb. 28, 1990 for "Apparatus for evacuating flowable media from discarded refrigerators and the like". It was also proposed to remove the motor, the compressor and certain other (particularly movable) parts prior to dumping of a useless cooling unit.

The just described treatment constitutes a giant step in the right direction. However, such preliminary treatment will normally result in controlled disposal of approximately 40 percent of deleterious ingredients which should be prevented from reaching the atmosphere, the waters and/or the soil in order to avoid serious pollution of the environment. The heretofore known preliminary treatment of cooling units which are about to be discarded is particularly unsatisfactory as far a the insulating material (polyurethane foam with cells which contain entrapped fluorochlorohydrocarbon gas) is concerned.

It was also proposed to simply burn partially treated or pretreated disposable cooling units. Such mode of disposing of cooling units constitutes an irresponsible waste of valuable recoverable materials and is equally unacceptable for ecological reasons. Combustion of cooling units invariably results in the escape of large quantities of dangerous pollutants into the atmosphere. Furthermore, experts in the field of disposing of various synthetic materials warn against combustion of polyurethane foams in incinerators because such combustion results in the development of dangerous dioxane, especially if the combustion takes place at temperatures below 1400° C.

Attempts to expel fluorochlorohydrocarbon gas from the cells of polyurethane foam as a result of heating subsequent to manual or mechanical dismantling and comminution of cooling units, and to thereupon recover the expelled gas, have met with negligible success. Moreover, experts in the relevant field are of the opinion that such mode of treating polyurethane foam is unacceptable because the liberated fluorochlorohydrocarbon gas tends to react with other substances and to form dangerous gaseous pollutants. Furthermore, it has been found that heretofore known methods of recovering fluorochlorohydrocarbon gas from polyurethane foam can ensure a mere partial recovery of as little as 40 percent and not more than 80 percent of fluorochlorohydrocarbon gas.

In accordance with a known proposal, a pilot plant was set up to heat polyurethane foam which was recovered from manually dismantled cooling units. The pilot plant was equipped with means for heating recovered polyurethane foam to a temperature of 170° C., the particles of foam were comminuted as a result of bombardment with steel balls, and this resulted in the release of R11 gas from the cells of foam particles. A drawback of such pilot plant is that its output is very low, the cost of disposing of polyurethane foam and of the gas in its cells is very high, and the treatment involves danger to the attendants and to the plant, primarily due to the need to heat polyurethane foam.

It was also proposed to mechanically dismantle the cooling units and to grind and thereupon heat the collected polyurethane foam. Such treatment was intended to result in expulsion of gases from the cells of the particles of foam. A drawback of this method is that it is dangerous, primarily due to the need for heating the foam.

In accordance with still another proposal, the treatment of polyurethane foam does not involve any heating. The first step includes evacuation of refrigerant and lubricant, and such step is followed by shredding of cooling units in a space which is sealed from the surrounding atmosphere. Shredding is followed by classification to segregate ferrous and nonferrous metals from other constituents prior to briquetting of other constituents which normally include foam and other nonmetallic substances. The briquetting operation is carried at a very high pressure which is supposed to suffice to ensure expulsion of up to 80 percent of fluorochlorohydrocarbon gas from the cells of polyurethane foam. The thus expelled gas is treated in a condensing plant. The apparatus which is used for the practice of the just outlined method is very complex, bulky and expensive. In addition, recovery of up to 80 percent of gases from the cells of polyurethane foam does not constitute a solution which is acceptable to ecologists in many countries, states, districts, cities and smaller communities.

OBJECTS OF THE INVENTION

An object of the invention is to provide a novel and improved method of achieving an ecologically satisfactory and economical disposal of polyurethane foam wherein the cells contain fluorochlorohydrocarbon gas.

Another object of the invention is to provide a novel and improved method of complete disposal of useless cooling units in a time saving, economical and safe manner.

A further object of the invention is to provide a novel and improved method of disposing of large numbers of refrigerators, freezers and other cooling units which contain polyurethane foam with cells confining fluorochlorohydrocarbon gas.

An additional object of the invention is to provide a method which ensures full or practically full recovery of fluorochlorohydrocarbon gas from the cells of fragments of polyurethane foam.

Still another object of the invention is to provide a novel and improved method of comminuting pretreated cooling units and of classifying the particles of comminuted cooling units according to their constituents.

An additional object of the invention is to provide a novel and improved method of treating polyurethane foam with no heating or with a minimum of heating but in such a way that the treatment results in recovery of well above 80 percent of gases which are confined in the cells of untreated polyurethane foam.

A further object of the invention is to provide a method which renders it possible to safely collect the expelled gases as well as degasified polyurethane foam and other constituents of discarded cooling units.

Another object of the invention is to provide a novel and improved apparatus for the practice of the above outlined method.

A further object of the invention is to provide a simple, compact and inexpensive apparatus which can process large numbers of cooling units or other foam-containing machines or machine parts per unit of time and which ensures ecologically acceptable disposal of deleterious ingredients as well as full or nearly full recovery of valuable constituents.

An additional object of the invention is to provide a mobile apparatus which can be readily transported or driven to the locale of intended use and which can be used for the processing of pretreated cooling units, sound- and heat-insulating facilities, parts of motor vehicles, scraps of polyurethane foam as well as many other devices, machines, implements and aggregates which contain polyurethane foam with cells confining fluorochlorohydrocarbon gas.

Another object of the invention is to provide the apparatus with novel and improved means for treating parts of cooling units and other devices which contain polyurethane foam prior to, during and after segregation and collection of fluorochlorohydrocarbon gas.

A further object of the invention is to provide an apparatus which is, or which can be, sufficiently automated to permit its use in developing countries as well as far away from industrial areas to ensure recovery of valuable and other constituents at locales where such constituents are to be dumped or recycled for renewed use.

Still another object of the invention is to provide an apparatus which can be automated to any desired extent and which can be used for the processing of small, large or medium sized cooling units or other commodities containing sufficient quantities of polyurethane foam to warrant their treatment in accordance with the improved method.

A further object of the invention is to provide the apparatus with novel and improved means for temporary storage and confinement of certain constituents of comminuted cooling units and/or other commodities which contain appreciable quantities of polyurethane foam.

SUMMARY OF THE INVENTION

One feature of the present invention resides in the provision of a method of processing polyurethane foam having cells which contain confined fluorochlorohydrocarbon gas. The method comprises the steps of pulverizing the foam in a suction chamber (i.e., below atmospheric pressure) to destroy the cells and release the confined gas, evacuating the released gas from the suction chamber, mixing the evacuated gas with a liquid; admitting the liquid-gas mixture into vessels, withdrawing pulverized foam from the chamber, and storing the withdrawn pulverized foam in containers.

Another feature of the invention resides in the provision of a method of processing pretreated cooling units (such as refrigerators and/or freezers) which contain a first constituent (such as metallic and/or plastic materials) and a second constituent including or consisting of polyurethane foam having cells which confine fluorochlorohydrocarbon gas. The method comprises the steps of introducing the cooling units (either singly or in groups of two or more) into a suction chamber, subdividing the units in the chamber in a plurality of stages into an accumulation of randomly distributed particles of first and second constituents, segregating the particles of foam from particles of the first constituent, removing segregated particles of the first constituent from the suction chamber, pulverizing segregated particles of foam to destroy the cells and release the confined gas, evacuating the released gas from the suction chamber, mixing the evacuated gas with water, admitting the water-gas mixture into vessels, withdrawing pulverized foam from the suction chamber, and storing the withdrawn pulverized foam in containers.

As a rule, or at least in many instances, the subdividing step will comprise subdividing the cooling units into substantially block-shaped (e.g., brick-shaped or cube-shaped) particles including certain particles which contain first constituents as well as foam. Therefore, the segregating step preferably comprises conveying and agitating the particles to break up the certain particles into first smaller particles which consist of the first constituent and second smaller particles which consist of foam.

The method can further comprise the step of collecting segregated (full size and smaller) particles of foam in a magazine, and the pulverizing step then preferably comprises drawing metered quantities of particles of foam from the magazine.

The conveying and agitating steps can include transporting the block-shaped particles by at least one rotary feed screw or an analogous conveyor which can thoroughly agitate as well as reduce the size of conveyed particles.

The evacuating step can include establishing a plurality of paths for evacuation of gas from the suction chamber and placing at least one filter across each path so that the filters permit evacuation (e.g., by means of a pump) of fluorochlorohydrocarbon gas and air but intercept solid particles of foam and/or first constituent. Such method can further comprise the step of condensing the evacuated gas not later than in the course of the mixing step.

Still further, the method can comprise the step of collecting pulverized foam in a magazine within the suction chamber, and the withdrawing step then preferably comprises conveying pulverized foam from the magazine at a predetermined rate, e.g., by means of a rotary cell wheel which admits batches of pulverized foam into a duct for withdrawal from the suction chamber by gravity flow.

The pulverizing step is preferably carried out within a closed comminuting station in the suction chamber, and the method preferably further comprises the step of flooding the comminuting station with fluorochlorohydrocarbon gas prior to initial admission of segregated particles of foam into the comminuting station.

A further feature of the invention resides in the provision of an apparatus for processing polyurethane foam of the type having cells which confine fluorochlorohydrocarbon gas. The apparatus comprises an enclosure which defines a suction chamber, means for pulverizing polyurethane foam in the chamber so as to destroy the cells and release the confined gas, means for evacuating the released gas from the chamber, means for mixing the evacuated gas with a liquid, means for admitting the liquid-gas mixture into vessels, means for withdrawing pulverized foam from the chamber, and means for storing the withdrawn pulverized foam in containers.

Still another feature of the invention resides in the provision of an apparatus for processing pretreated cooling units (such as discarded refrigerators and/or freezers which are devoid of compressors and/or certain other parts and are relieved of supplies of coolant and lubricant) which contain a first constituent (such as metallic and/or plastic materials) and a second constituent including or consisting of polyurethane foam having cells which confine fluorochlorohydrocarbon gas. The apparatus comprises an enclosure which defines a suction chamber, means for subdividing cooling units in the chamber in a plurality of stages to convert the units into an accumulation of randomly distributed particles of first and second constituents, means for segregating the particles of foam from particles of the first constituent in the chamber, means for removing segregated particles of first constituent from the chamber, means for pulverizing segregated particles of foam in the chamber to destroy the cells and thereby release the confined gas, means for evacuating the released gas from the chamber, means for mixing the evacuated gas with water, means for admitting the water-gas mixture into vessels, means for withdrawing pulverized gas from the chamber, and means for storing the withdrawn pulverized foam in containers.

For example, the subdividing means can include three serially arranged subdividing devices which are disposed at different levels within the chamber. In accordance with a presently preferred embodiment, the subdividing means comprises means for subdividing cooling units into an agglomeration of particles at least some of which contain first constituents as well as foam. The segregating means of such apparatus preferably comprises means for conveying and agitating the accumulation of randomly distributed particles to thereby break up the at least some particles into first smaller particles which consist of the first constituent (particularly metal and/or plastic) and into second smaller particles which consist of foam.

The segregating means can comprise a substantially upright duct having an upper portion and a lower portion, means for supplying randomly distributed particles into the upper portion of the duct whereby the relatively heavy particles of first constituent descend by gravity and leave the duct, and means for effecting the flow of a stream of gaseous fluid from the lower portion toward the upper portion of the duct to entrain the relatively lightweight particles of foam. The flow effecting means can include means for blocking particles of foam to the pulverizing means.

The removing means can comprise at least one rotary feed screw and the pulverizing means can comprise a centrifugal mill. The withdrawing means can comprise one or more gates.

The evacuating means can define a plurality of paths for evacuation of gas from the chamber and such evacuating means can include filters which extend across the paths to permit outflow of air and fluorochlorohydrocarbon gas but to intercept solid particles of foam and first constituent.

The mixing means can comprise means for condensing the evacuated gas, and the admitting means can comprise a cooled compartment in the suction chamber.

The apparatus can further comprise a magazine which is provided in the chamber to receive segregated particles of foam and to dispense particles of foam to the pulverizing means. The apparatus can further comprise a magazine which is provided in the chamber to receive pulverized foam and to dispense pulverized foam to the withdrawing means. The apparatus can be provided with a second enclosure which is installed in the suction chamber and defines a second suction chamber. The magazine for pulverized foam and the pulverizing means are installed in the second suction chamber, and the second enclosure is provided with a first gate for admission of segregated particles of foam to the pulverizing means and with a second gate for admission of pulverized foam from the pulverizing means to the withdrawing means.

Still further, the apparatus can comprise means for admitting fluorochlorohydrocarbon gas into the pulverizing means so as to flood the pulverizing means with gas prior to starting of the apparatus. Such apparatus preferably further comprises means for heating fluorochlorohydrocarbon gas prior to admission into the pulverizing means.

It is often desirable to provide the apparatus with means for intercepting certain particles, particularly metallic particles (if any) which advance with segregated particles of foam intermediate the segregating and pulverizing means. Such intercepting means can comprise one or more magnetic separators.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
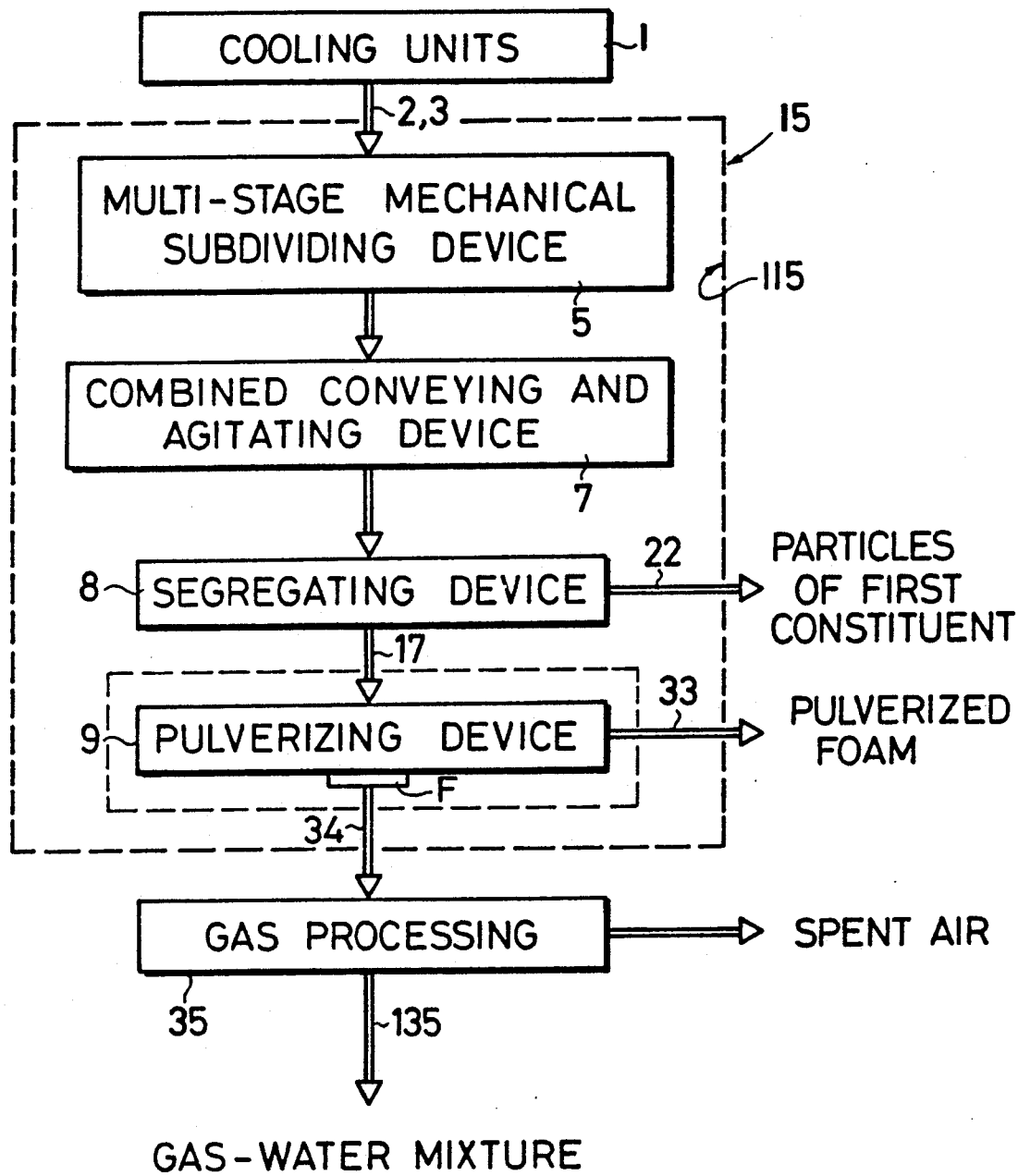
FIG. 1 is a flow diagram showing the progress of pretreated cleaning units and their constituents in an apparatus which embodies the invention.

FIG. 1 is a flow diagram showing the progress of pretreated cleaning units 1 and their constituents through various stations of the improved apparatus. Successive pretreated cooling units 1 or successive groups of two or more cooling units are picked up by introducing means in the form of one or more vehicles 2 (FIG. 2) to be delivered onto a pivotable platform 16 which defines or is adjacent to a heatable and sealable compartment 3 and constitutes one end wall (preferably the rear end wall) of an elongated wheel-mounted mobile enclosure 15 defining a suction chamber 115. The platform 16 is thereupon pivoted to move the compartment 3 (and the cooling unit or units 1 therein) to the position 3' so that the contents of the compartment can descend through a gate 4 and into a multi-stage composite mechanical severing or subdividing device 5. The latter comminutes the cooling unit or units 1 into block-shaped (e.g., brick-shaped or cube-shaped) particles including particles which contain a first constituent (normally metal and/or plastic), particles which contain a second constituent (severed polyurethane foam with fluorochlorohydrocarbon gas confined in its pores or cells), and particles which contain first and second constituents. The thus obtained agglomeration of randomly distributed particles containing first and/or second constituents is conveyed and agitated by a combined conveying and agitating device 7 to promote and preferably complete the breaking up of composite particles into first smaller particles consisting of or containing primarily the first constituent and second smaller particles consisting or containing primarily fragments of polyurethane foam.

The resulting mixture of randomly distributed larger and smaller particles containing or consisting of the first constituent and larger as well as smaller particles containing or consisting of polyurethane foam (hereinafter called foam for short) are thereupon introduced into a segregating or classifying device 8 wherein the particles of foam are segregated from other particles and the other particles are removed at 22 to form a pile 23 (FIG. 2) in a trailer 123 or another suitable conveyance. The pile 23 is transported to a recycling station for metallic and/or plastic materials. The exact nature of the recycling operation forms no part of the invention.

Segregated particles of foam are conveyed (e.g., at least in part through a conduit 17) into a pulverizing device 9 (such as a centrifugal mill) wherein the particles are converted into powder with attendant breaking up of cells and release of fluorochlorohydrocarbon gas (hereinafter called gas for short). Pulverized foam is withdrawn from the suction chamber 115 (e.g., through a gravity duct 33) and is admitted into containers 37 (FIG. 3), e.g., into bags which are stacked in a larger container 137 such as a second trailer of a motor vehicle 237 shown in FIG. 3.

Released gas is evacuated from the pulverizing device 9 by way of a conduit 34 to be introduced into a combined condensing and mixing device 35 wherein the gas is mixed with water. Spent air is withdrawn or released at 235 and the water-gas mixture is introduced into a conduit 135 for admission into liquid-receiving vessels 43. The conduit 34 contains one or more filters F (FIG. 1) which permit the gas and air to flow into the combined condensing and mixing device 35 but intercept comminuted foam and/or other constituents. Evacuation of gas from the pulverizing device 9 can take place by resorting to one or more pumps or other fluid flow machines which draw the gas from the pulverizing device and force the thus withdrawn gas to flow into the combined condensing and mixing device 35.

Figure 3:
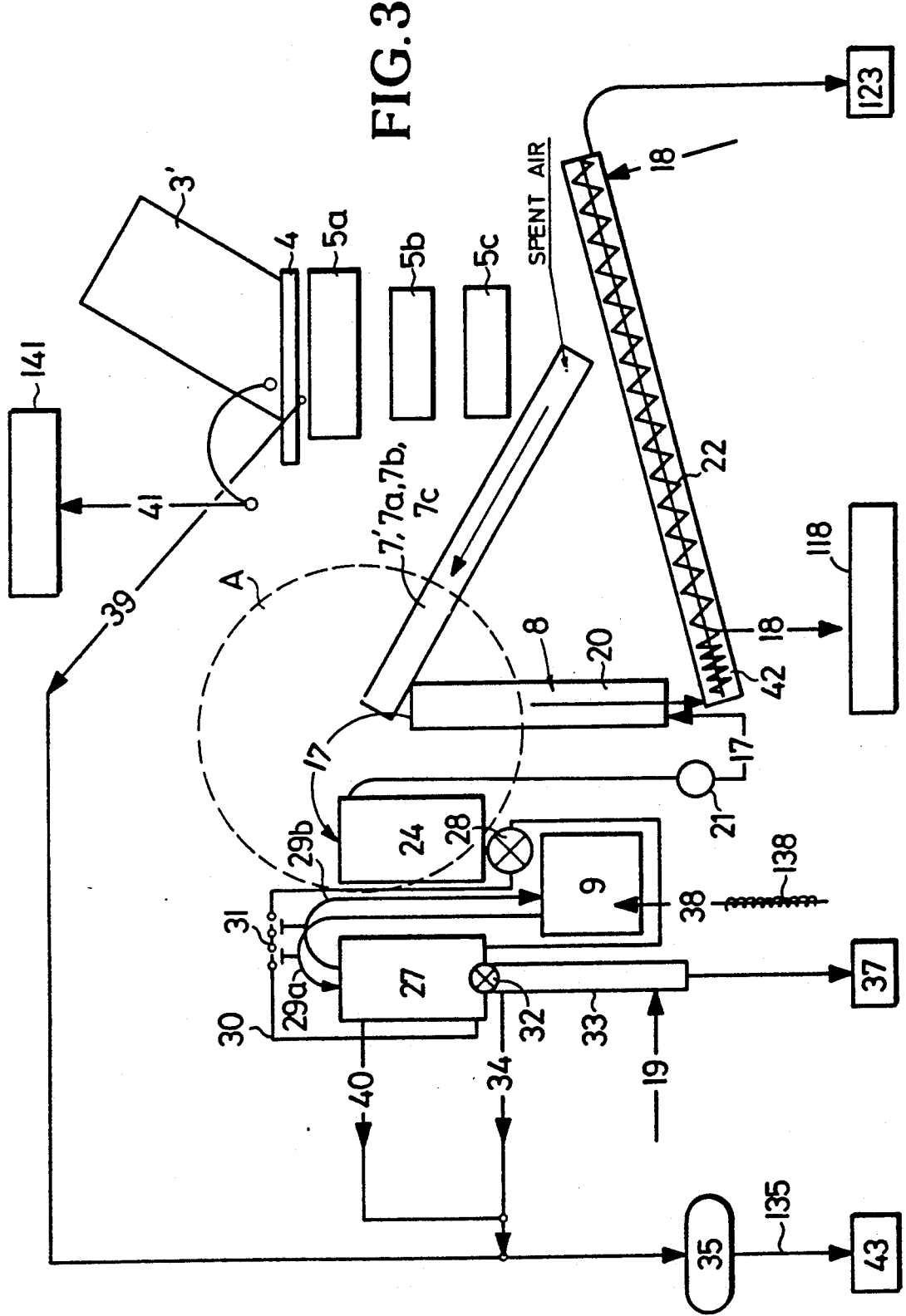
FIG. 3 is a diagrammatic view of certain devices in the apparatus of FIG. 1.

The enclosure 15 is provided with several (e.g., four) conduits which establish paths for the evacuation of gas from the equipment in the suction chamber 115. FIGS. 1 and 3 show the aforementioned conduit 34 and FIG. 3 shows three additional conduits 18, 40 and 41 each of which preferably contains one or more filters F (not specifically shown) serving to intercept all solid particles so that only the gas and air are free to escape from the enclosure 15 to be admitted into the condensing-mixing device 35 or to one of two or more devices 35. The pulverizing device 9 and a cyclone type magazine 27 for pulverized foam are preferably confined in a second enclosure 30 (FIG. 3) which defines a second suction chamber within the suction chamber 115.

An advantage of the wheel-mounted enclosure 15 is that it can be rapidly transported or driven to a selected locale, such as to a dumping ground for useless cooling units 1 or to a station which is close to a recycling plant for the pile 23 of comminuted first constituents. The illustrated enclosure 15 resembles a semitrailer which preferably comprises a fifth wheel adapted to be hitched to a towing vehicle 215. The towing unit of the motor vehicle 237 serves to tow the trailers 137 and 123.

As mentioned above, the cooling units 1 which are manipulated by the vehicle 2 are preferably pretreated. Such pretreatment can involve removal of the motor, compressor and/or parts which are made of glass. Furthermore, pretreatment of cooling units 1 can and preferably does involve a treatment in a manner as disclosed in the aforementioned commonly owned copending patent application Ser. No. 487,029. The disclosure of the copending application is incorporated herein by reference. This copending application discloses an apparatus which relieves refrigerators, freezers and/or other cooling units of coolant (refrigerant) and lubricant. The coolant and/or the lubricant normally or often contains fluorochlorohydrocarbon gas which should be prevented from escaping into the atmosphere, water and/or soil.

Figure 2:
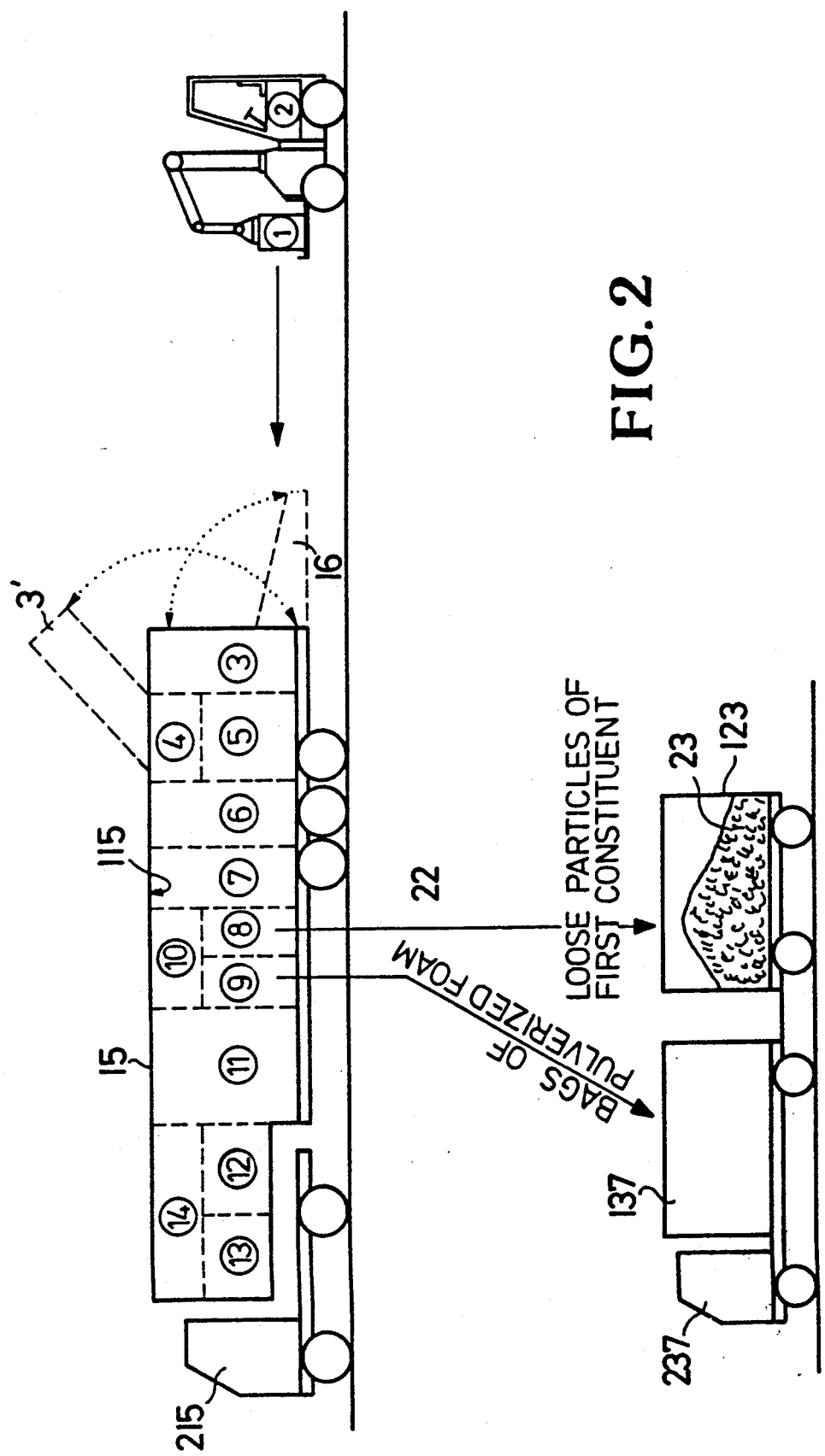
FIG. 2 is a schematic elevational view of a mobile apparatus which embodies one form of the invention and can be used with advantage for the processing of pretreated cooling units.

Referring now in greater detail to FIGS. 2 to 5, and first to FIG. 2, the enclosure 15 includes a compartment 11 which can receive the vehicle 2 when the latter is not in use to load cooling units 1 onto the pivotable platform 16, e.g., when the towing vehicle 215 is in the process of transporting the enclosure (semitrailer) 15 to a different locale for useless cooling units. The dimensions of the platform 16 can be selected in such a way that it can simultaneously support as many as ten (or even more) standard cooling units 1. The platform 16 is maintained in a substantially horizontal position during looding of a selected number of cooling units 1 by the vehicle 2, and the thus accumulated cooling units can be fed seriatim or simultaneously from the compartment 3, through the gate 4 and into the severing or subdividing device 5 for conversion into an aggregation of randomly distributed particles of foam and/or other constituent or constituents. Gathering of several cooling units 1 in the compartment 3 at the platform 16 and controlled feeding of such cooling units from the compartment 3, through the gate 4 and into the subdividing device 5 renders it possible to reduce the quantity of atmospheric air which is admitted into the suction chamber 115 as a result of introduction of cooling units into the enclosure 15.

The operation of the improved apparatus is or can be automated, either entirely or to a desired extent. For example, the driver's compartment of the vehicle 2 can contain one or more wireless senders which transmit appropriate signals to an electronic control center 6 in the enclosure 15, and such control center thereupon transmits signals which initiate the operation of various devices in a desired sequence and for desired intervals of time.

The platform 16 is or can be provided with means for airtightly sealing the compartment 3 from the atmosphere upon admission of individual cooling units 1 or upon admission of groups of two or more cooling units, and this platform is or can be further provided with means for heating the contents of the compartment 3 to a desired temperature.

The compartment 3 need not be provided on the pivotable platform 16; such compartment can be provided in the enclosure 15 and can be pivoted to the position 3' as soon as it has received a selected or available number of cooling units 1. Once pivoted to the position 3', the compartment 3 is ready to admit cooling units 1 (either singly or in groups of two or more) into the subdividing device 5 by way of the gate 4. Heating of the compartment 3 is desirable and advantageous because this promotes the expulsion of spent air via conduit 41 (FIG. 3) to a collecting device 141. Such spent air can contain fluorochlorohydrocarbon gas and, therefore, the conduit 41 preferably contains a filter F. The collecting device 141 can admit the mixture of air and gas to the condensing-mixing device 35 or to a separate condensing-mixing device. The conduit 41 can contain one or more pumps which draw the mixture of air and gas from the compartment 3. The gate 4 is sealingly coupled to the compartment 3 not later than when the compartment 3 is pivoted to the position 3'.

Figure 5:
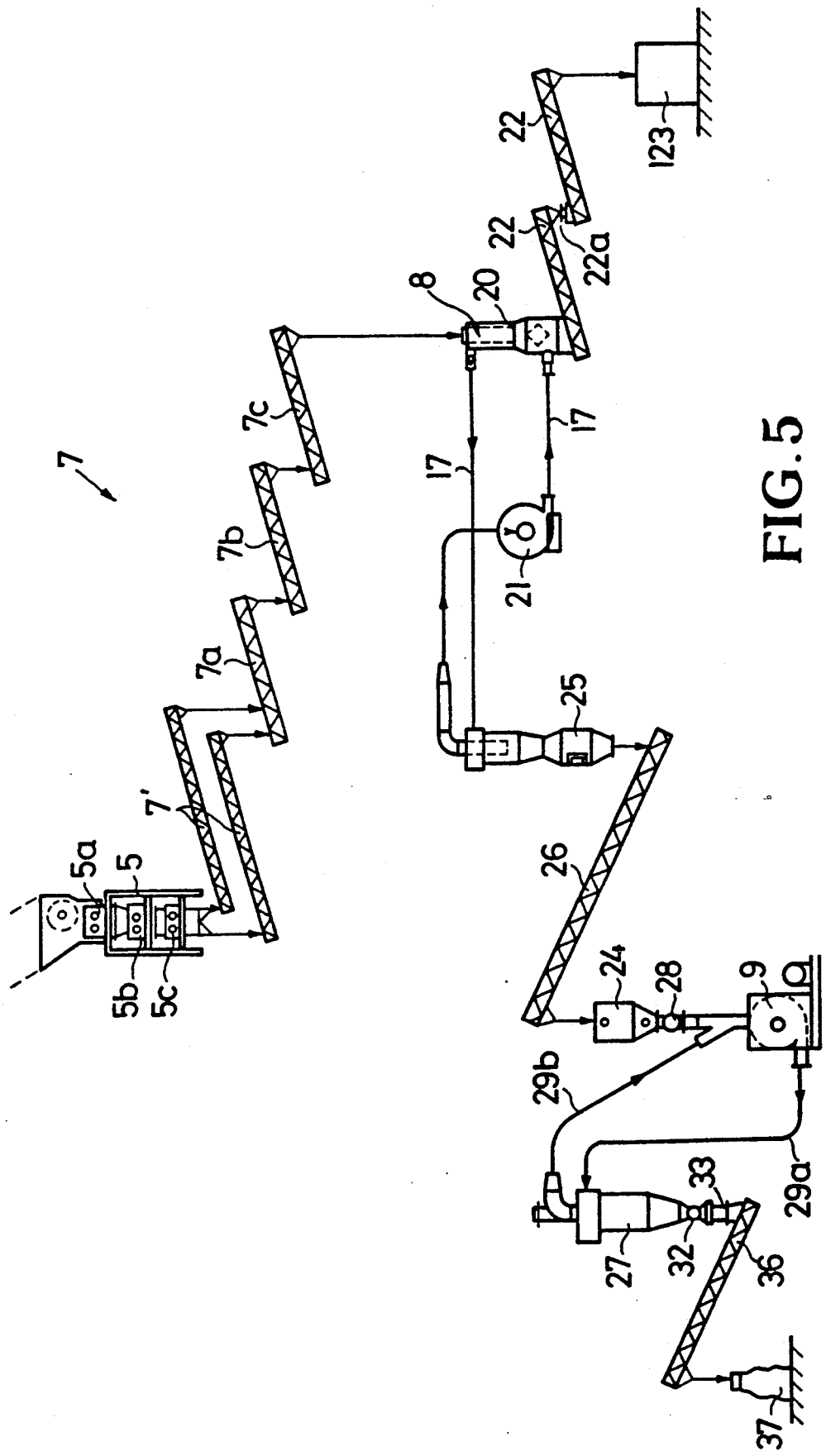
FIG. 5 is a schematic view of certain devices in the apparatus of FIG. 3.

The gate 4 can be provided with a slidable or otherwise movable bottom wall (not specifically shown) which can be withdrawn, either entirely or in part, to establish a path for the transfer of cooling units 1 into the subdividing device 5. The gate 4 preferably further contains one or more pushers (e.g., in the form of hydraulic cylinder and piston units, not shown) which can be operated to forcibly transfer cooling units 1 from the interior of the gate 4 into the first stage or section 5a of the subdividing device 5. The pusher or pushers can be operated to transfer cooling units 1 in a predetermined orientation and/or to a selected portion of the topmost subdividing section or stage 5a. The subdividing device 5 which is shown in FIGS. 2, 3 and 5 comprises a second section 5b at a level below the topmost section 5a and a third section 5c at a level below the median section 5b. The exact construction of the subdividing device 5 forms no part of the invention. For example, this device can be equipped with standard automatic load-dependent reversing means to optimize the flow of material from the gate 4 to the combined agitating and conveying device 7. Furthermore, the subdividing device 5 can be equipped with commercially available electric interlocking means for various drives and with means for monitoring the level of comminuted material in one, two or all three comminuting sections. By way of example, the subdividing device 5 can be designed to convert the cooling units 1 into agglomerations of randomly distributed particles which resemble or constitute cubes with edges having a length in the range of or close to 10 mm. However, it is equally within the purview of the invention to break up the cooling units 1 into particles which resemble bricks or other block-shaped bodies without departing from the spirit of the invention.

Particles of cooling units 1 which leave the lowermost section 5c of the subdividing device 5 are admitted into the two topmost feed screws 7' (FIG. 5) of the combined agitating and conveying device 7. The feed screws 7' are parallel to each other and their discharge ends admit particles into the next feed screw 7a which is the first of three discrete serially arranged feed screws further including those shown at 7b and 7c. Each of the feed screws 7', 7a, 7b, 7c constitutes an elevator which conveys particles from a lower level to a higher level. In addition, at least one of these feed screws can be equipped with auxiliary equipment in the form of paddles or the like to effect even more pronounced agitation of conveyed particles. The purpose of the feed screws 7', 7a, 7b, 7c and of the auxiliary equipment, if any, is to promote frictional engagement between neighboring particles and to thus effect reliable breaking up of composite particles, i.e., to segregate lightweight portions (foam) of particles from relatively heavy portions which consist of or contain a metallic and/or solid plastic material. Agitation and breaking up of composite particles can be promoted by driving the feed screw 7b at a speed which is higher than that of the feed screw 7a and/or by driving the feed screw 7c at a speed which is higher than that of the feed screw 7b. This results in even more pronounced frictional engagement of neighboring particles and impingement of particles against each other with more reliable separation of foam from other constituents of comminuted cooling units 1.

The outlet of the last feed screw 7c of the combined agitating and conveying device 7 admits the mixture of particles of foam and particles containing other constituents into the segregating device 8 which classifies the admitted particles according to their weight, i.e., the smaller and larger lightweight particles of foam are separated from smaller and larger heavier particles containing metallic, solid plastic and/or other materials. The feed screw 7c further serves to supply the mixture of particles containing foam and particles containing other constituents at a controlled rate into an upright or substantially upright pipe or duct 20 forming part of the classifying or segregating device 8 as well as part of the device which removes metallic and/or plastic particles from the enclosure 15 for introduction into the trailer 123. The duct 20 has an upper portion which receives the mixture of particles from the feed screw 7c and a lower portion which can admit segregated particles of metallic and/or solid plastic material into the receiving end of one of several (e.g., two feed screws 22 which form part of the aforementioned removing device and deliver segregated metallic and/or plastic particles into the trailer 123.

The classifying or segregating device 8 further comprises a blower or fan 21 which effects the flow of a stream of gaseous fluid (e.g., air) from the lower end toward and beyond the upper end of the duct 20 so that the air stream entrains the lightweight particles of foam but permits the heavier particles of metallic and/or solid plastic material to descend by gravity on their way through the duct 20 and into the first feed screw 22. The outlet of the fan 21 admits the fluid stream into a first portion of the conduit 17 which conveys the air stream into the lower portion of the duct 20. A second portion of the conduit 17 conveys the air stream and the entrained particles of foam from the upper portion of the duct 20 into a magazine 24 which serves to collect particles of foam ahead of the pulverizing device 9.

The second or lower feed screw 22 is preferably pivotable about a vertical axis (as at 22a) to ensure that the removed particles of metallic and/or plastic material can be properly distributed in the interior of the trailer 123, i.e., to ensure that the accumulated pile 23 of such particles will be more or less evenly distributed on the bottom wall of the trailer 123.

FIG. 3 shows only one of the two feed screws 22. This feed screw has closely adjacent convolutions 42 adjacent its particle receiving end beneath the duct 20. Furthermore, the apparatus comprises the aforementioned conduit 18 which admits fresh air into the discharge end of the feed screw 22 of FIG. 3 and draws a mixture of air and fluorochlorohydrocarbon gas from the inlet end of the illustrated feed screw 22. The conduit 18 delivers such mixture to a collecting station 118 for the mixture of air and gas. It will be noted that fresh air (preferably heated fresh air) which is supplied by the right-hand portion of the conduit 18 flows counter to the direction of advancement of particles of metallic and/or plastic material in the feed screw of FIG. 3 toward the pivot or swivel axis 22a or directly into the trailer 123. The conduit 18 greatly reduces the danger of uncontrolled escape of fluorochlorohydrocarbon gas from the enclosure 15 into the atmosphere.

Figure 4:
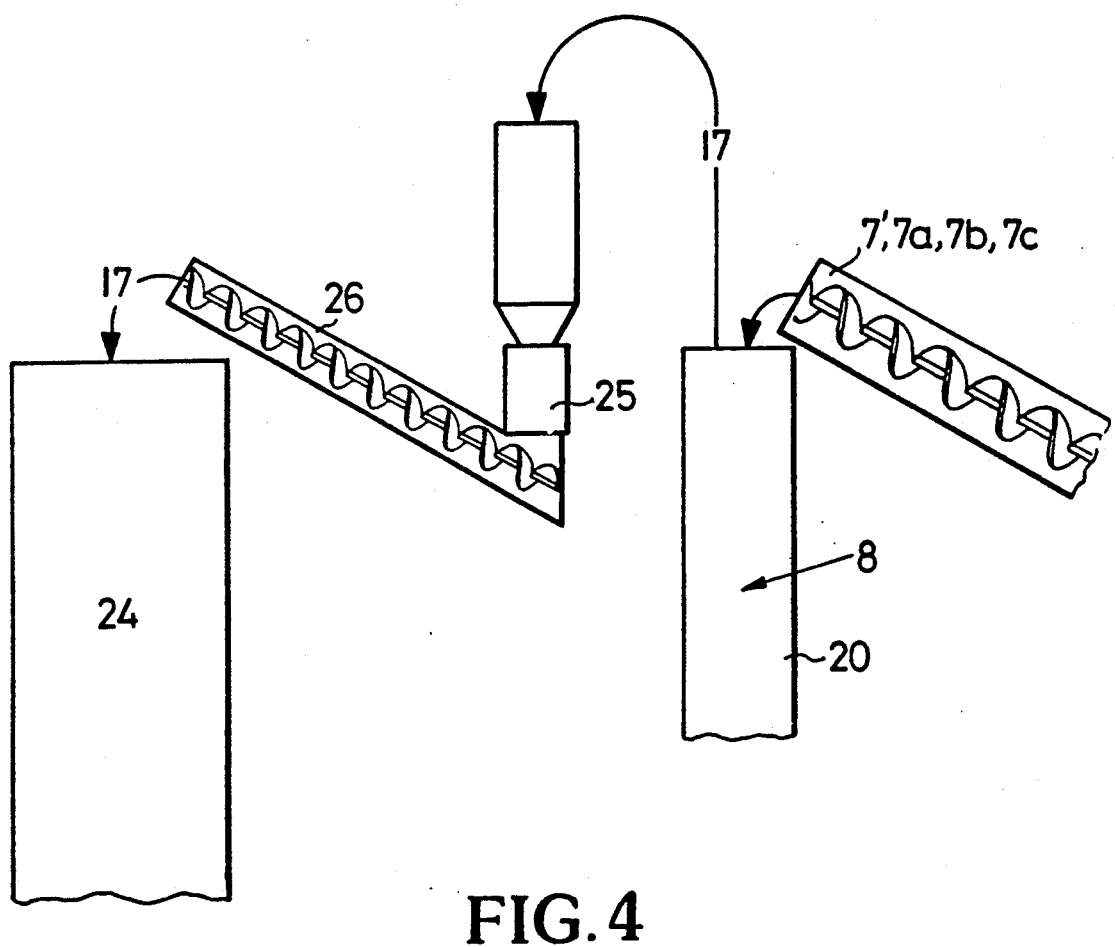
FIG. 4 is an enlarged view of a detail within the phantom-line circle A in FIG. 3.

FIGS. 4 and 5 show that the enclosure 15 can further contain an intercepting device 25 (e.g., a magnetic separator) which defines a path for the propulsion of foam particles from the duct 20 toward the magazine 24. The device 25 intercepts minute particles of metallic material which might have been entrained by the air stream in the conduit 17 during upward transport of foam particles in the duct 20 and toward the magazine 24. The illustrated intercepting device 25 can include an upright tube the internal surface of which carries magnets serving to attract particles of ferrous material and/or other magnetizable particles adhering to particles of foam which descend in the device 25 by gravity flow.

A portion of the conduit 17 can constitute or can be replaced with an elevator 26 in the form of a feed screw serving to advance foam particles (which are devoid of ferromagnetic impurities) from the lower end of the magnetic separator 25 into the magazine 24. The enclosure 15 is provided with one or more conveyors (e.g., in the form of feed screws which are not shown in the drawing) for continuous or intermittent evacuation of intercepted ferromagnetic and/or other magnetizable particles out of the suction chamber 115, for example, into the trailer 123 or into one of the feed screws 22.

The outlet of the magazine 24 admits particles of foam into a gate 28 (e.g., a so-called cell wheel) which dispenses metered quantities of foam particles into the pulverizing device 9. As mentioned above, the pulverizing device 9 can include or constitute a centrifugal mill which is capable of pulverizing the particles of foam so that the device 9 discharges a stream of pulverulent foam with particle size in the range of 0.1 mm. This suffices to ensure opening of all cells and the release of entrapped gases (R 11). The outlet of the pulverizing device 9 discharges a mixture of air, gas and pulverized foam and such mixture is conveyed into the cyclone type magazine 27. The latter is preferably provided with its own fluid-circulating system having conduits 29a, 29b extending between the pulverizing device 9 and the magazine 27 to avoid the influencing of subatmospheric pressure in the suction chamber 115 of the enclosure 15. The conduit 29a is installed to convey flowable material from the outlet of the pulverizing device 9 to the inlet of the cyclone type magazine 27, and the conduit 29b conveys flowable material from the upper outlet (gas outlet) of the magazine 27 to the pulverizing device 9.

The safety of the apparatus is enhanced by the provision of the aforementioned second enclosure 30 (FIG. 3) with its own suction chamber which confines the pulverizing device 9 and the magazine 27. The enclosure 30 greatly reduces the likelihood of dust explosion in the outer enclosure 15. The roof of the second enclosure 30 is provided with one or more bursting or rupture discs 31 which control the direction of propagation of pressure waves in the event of a dust explosion in the enclosure 30. The pressure in the chamber of the enclosure 30 is preferably regulatable independently of pressure in the chamber 115 of the enclosure 15.

The apparatus is preferably provided with additional safety features such as one or more pressure relief valves in the conduit 29a leading to and/or in the conduit 29b leading from the magazine 27. A further safety feature can include means for cooling the conduit 29a which conveys flowable material from the pulverizing device 9. Furthermore, it is desirable to ensure that the chamber of the second enclosure 30 contain a small quantity of air but a high percentage of fluorochlorohydrocarbon gas as well as that the enclosure 30 be devoid of means for generating sparks. A combination of some or all of the above safety features ensures that the likelihood of dust explosion in the enclosure 30 is nil or negligible.

It is further desirable to flood the chamber of the enclosure 30 with fluorochlorohydrocarbon gas after each relatively long period of idleness of the apparatus, e.g., prior to start of a morning shift if the apparatus was idle overnight. The means for supplying gas into the enclosure 30 comprises at least one conduit 38 (FIG. 3) which is preferably heatable by an electric or other suitable heating unit 138 and discharges heated gas into the pulverizing device 9, into the magazine 27 and/or directly into the chamber of the enclosure 30. This even further reduces the likelihood of dust explosion. The conduit 38 can draw gas from the condensing-mixing device 35.

The magazine 27 is preferably equipped with a level indicator (not specifically shown) for the supply of pulverized foam therein, and the outlet at the lower end of this magazine discharges metered quantities of pulverized foam through a rotary cell wheel gate 32 (FIG. 5) into an upright duct 33 which, together with the gate 32, can be said to constitute a means for withdrawing pulverized foam from the enclosure 15 for admission into an elevator 36 (e.g., a feed screw) which delivers pulverized foam to the station where the pulverized foam is admitted into containers 37, e.g., into bags which are thereupon sealed and stored in the trailer 137 of FIG. 2. The descending flow of pulverized foam in the duct 33 is washed by an ascending stream of heated fresh air which is admitted via conduit 19 (FIG. 3). The stream of heated air rises in the tube or duct 33, and the mixture of heated air and fluorochlorohydrocarbon gas leaves the upper portion of the duct 33 via conduit 34 to be admitted into the condensing-mixing device 35. Processing of blowing agent (i.e., of the gas which fills the cells of non-pulverized foam particles and contains or consists of fluorochlorohydrocarbon gas) begins in the subdividing device 5. That percentage of gas which is released in the subdividing device 5 is evacuated via conduit 39 (FIG. 3) which delivers the collected gas to the combined condensing and mixing device 35. The latter further receives gas which is released in the magazine 27 (note the conduit 40 in FIG. 3). Additional gas is collected and supplied to the device 35 by the conduit 34 which receives heated air and gas from the upper portion of the tube or duct 33. Furthermore, the device 35 can receive a gas-air mixture from the conduit 18, i.e., from the collecting station 118 of FIG. 3.

The device 35 comprises or is combined with a suitable compressor for the gas which has been filtered to be relieved of solid particles. Such gas is cooled in stages in the customary way and is mixed with water before the thus obtained water-gas mixture is admitted into the conduit 135 for collection in suitable vessels 43. The vessels 43 can be stored in a cooled and insulated compartment 12 (FIG. 2) within the enclosure 15. The gas which is stored in the vessels 43 is to be recycled in a manner not forming part of the present invention.

It has been found that the above outlined apparatus can collect at least 90 percent of fluorochloroflurocarbon gas which is released as a result of cutting, agitating, conveying and pulverizing of polyurethane foam. The recovery can be increased to, or close to, 100 percent by providing the apparatus with one, two or more activated carbon filters (not shown) serving to receive fluorochlorohydrocarbon gas containing air-gas mixture from the paths which are defined by the conduits 18, 41 and that portion of the gas which is not condensed in the device 35. For example, the apparatus can be equipped with two activated carbon filters one of which is in use to absorb gases while the other filter is being regenerated by desorption and vice versa.

The concentrations of gas in the mixtures of air and gas are continuously monitored to ascertain the degree of saturation of that activated carbon filter which is in actual use. When a filter is saturated, the monitoring system can initiate the desorpting (regenerating) step and connects the other filter with sources of gas and air-gas mixture to thus ensure continuous collection of all traces of fluorochlorohydrocarbon gas.

The efficiency of available activated carbon filters is approximately 90 percent so that, if the apparatus employs the condensing/mixing device 35 and one or more activated carbon filters, its efficiency can be raised to approximately 99 percent.

The apparatus is preferably further equipped with means for monitoring the rate of escape of fluorohydrocarbon gas into the atmosphere and for keeping a record of the results of such monitoring operation.

FIG. 2 shows that the devices (such as the pulverizing device 9) which effect the release of substantial quantities of gas are preferably installed in or at the central or median portion 10 of the enclosure 15. In addition to the pulverizing device 9, the median portion 10 can accommodate the magazine 27 and the combined agitating and conveying device 7.

The electronic control center 6 of the improved apparatus can include a programmable memory which ensures that the various devices are operated in an optimum sequence, at an optimum speed and for optimum intervals of time. The control center 6 can further ensure automatic flooding of the chamber in the second enclosure 30 with heated gas prior to setting the apparatus in operation after a relatively long interval of standstill, automatic retention of the chamber 115 and of the chamber in the enclosure 30 at an optimum pressure, and a host of other operations which contribute to predictable and optimum treatment of cooling units 1, particles of various constituents of cooling units, released gas, metallic and/or solid plastic constituents and pulverized foam. As mentioned above, the operator of the vehicle 2 can transmit radio signals to the control center 6 in the enclosure 15.

The front portion of the enclosure 15 can serve for storage of fuel (as at 13) for the engine of the towing vehicle 215. If the engine of the towing vehicle 215 is operated with diesel fuel, the apparatus can further comprise a regenerable soot filter 14 for combustion products. Furthermore, at least the front portion of the enclosure 15 can be provided with one or more layers of noise absorbing material. The filter 14 and the sound insulating means are particularly desirable if the apparatus is to be put to use in a plant rather than outdoors or is to be used indoors and outdoors.

Used cooling units 1 constitute but one of numerous commodities which can be treated in the improved apparatus and in accordance with the novel method. For example, the apparatus including the enclosure 15 can be used for the treatment of all kinds of commodities which consist of or include polyurethane foam wherein the cells contain fluorochlorohydrocarbon gas.

Such commodities includes various sound and heat insulating materials, scraps of polyurethane foam, parts of motor vehicles, various fittings and analogous parts which contain polyurethane foam as well as any other parts which consist of or contain hard foam.

A suitable mechanical comminuting device which can be used in the improved apparatus is known and is distributed by MOCO Maschinen- und Apparatebau Huber GmbH of 6806 Viernheim, Federal Republic of Germany. A pulverizing device which can be used in the enclosure 15 is known and is manufactured and sold by CONDUX Maschinenbau GmbH & Co. KG of 6450 Hanau, Federal Republic of Germany. Combined condensing and mixing devices which can be used in the improved apparatus are known and can be purchased from ATLAS COPCO Kompressoren GmbH at 4300 Essen, Federal Republic of Germany. Control centers which can regulate the operation of various devices within and outside of the enclosure 15 can be of the type known and distributed by FESTO KG at 7300 Esslingen, Federal Republic of Germany.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of processing polyurethane foam having cells which contain confined fluorochlorohydrocarbon gas, comprising the steps of pulverizing the foam in a suction chamber to destroy the cells and release the confined gas; evacuating the released gas from the chamber; mixing the evacuated gas with a liquid; admitting the liquid-gas mixture into vessels; withdrawing pulverized foam from the chamber; and storing the withdrawn pulverized foam in containers.

2. A method of processing pretreated cooling units which contain a first constituent, such as metallic and/or plastic materials, and a second constituent including polyurethane foam having cells which confine fluorochlorohydrocarbon gas, comprising the steps of introducing cooling units into a suction chamber; subdividing the units in a plurality of stages into an accumulation of randomly distributed particles of first and second constituents; segregating the particles of foam from particles of the first constituent; removing segregated particles of the first constituent from the suction chamber; pulverizing segregated particles of foam to destroy the cells and release the confined gas; evacuating the released gas from the chamber; mixing the evacuated gas with water; admitting the water-gas mixture into vessels; withdrawing pulverized foam from the chamber; and storing the withdrawn pulverized foam in containers.

3. The method of claim 2, wherein said subdividing step comprises subdividing the units into substantially block-shaped particles including certain particles which contain first constituents and foam, said segregating step comprising conveying and agitating the particles to break up said certain particles into first smaller particles consisting of said first constituent and second smaller particles consisting of foam.

4. The method of claim 3, further comprising the step of collecting segregated particles of foam in a magazine, said pulverizing step including drawing metered quantities of particles from the magazine.

5. The method of claim 3, wherein said conveying and agitating steps include transporting the block-shaped particles by at least one rotary feed screw.

6. The method of claim 2, wherein said evacuating step includes establishing a plurality of paths for evacuation of gas from the chamber and placing a filter across each of said paths so that the filters permit evacuation of fluorochlorohydrocarbon gas and air but intercept solid particles, and further comprising the step of condensing the evacuated gas not later than in the course of said mixing step.

7. The method of claim 2, further comprising the step of collecting pulverized foam in a magazine within the chamber, said withdrawing step including conveying pulverized foam from the magazine at a predetermined rate.

8. The method of claim 2, wherein said pulverizing step is carried out at a comminuting station and further comprising the step of flooding said station with fluorochlorohydrocarbon gas prior to initial admission of segregated-particles of foam into such station.

* * * * *